United States Patent Office 3,400,108
Patented Sept. 3, 1968

3,400,108
POLYMERS OF N - (7,7 - DIALKYL - BICY-
CLO[3.2.0.]HEPT - 6 - YL) ACRYLAMIDES
AND METHACRYLAMIDES
John R. Caldwell and Edward H. Hill, Kingsport, Tenn.,
assignors to Eastman Kodak Company, Rochester,
N.Y., a corporation of New York
No Drawing. Continuation-in-part of application Ser. No.
168,819, Jan. 25, 1962. This application Jan. 22, 1965,
Ser. No. 427,496
13 Claims. (Cl. 260—82.1)

This application is a continuation-in-part of SN 168,819 filed Jan. 25, 1962 of Caldwell et al. titled, "Polymers of N-(7,7-dialkyl-bicyclo[3.2.0.]hept-6-yl) Acrylamides and Methacrylamides," and concerns N - (7,7 - dialkylbicyclo [3.2.0.]hept-6-yl) acrylamides and methacrylamides having the general structure:

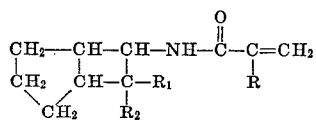

wherein R represents hydrogen or methyl group, and each of $R_1$ and $R_2$ represent alkyl groups of from 1–4 carbon atoms, e.g., methyl, ethyl, propyl, isopropyl, n-butyl, etc., groups, and further concerns resinous linear homo and copolymers thereof. These polymers range in properties from elastic and rubbery copolymers with diolefinic comonomers, e.g., with butadiene, to hard solid homopolymers and copolymers with comonomers containing but a single —CH=C< or $CH_2$=C< group, which latter copolymers have sticking or softening points ranging from about 150 to 230° C. All of the polymers are soluble in one or more common organic solvents such as methylene chloride, 1,4-dioxane, etc., and those copolymers containing a major proportion of acrylonitrile, e.g., 60 to 95 percent by weight, are soluble in solvents such as dimethylformamide, dimethylacetamide, γ-butyrolactone, dimethylsulfolane, etc. Such solutions can be readily coated to films and sheets or spun into fibers having excellent physical properties and good affinity for commercial dyes. The copolymers containing mostly acrylonitrile are especially useful for fiber-making purposes, while the copolymers prepared with vinyl acetate, vinyl chloride, vinylidene chloride, etc., give tough, clear films. Other copolymers of the invention are particularly useful for the preparation of extruded and molded shaped articles.

It is, accordingly, an object of the invention to provide the above defined new class of acrylamides and methacrylamides. Another object is to provide resinous polymers thereof. Another object is to provide useful shaped articles from such polymers. Another object is to provide means for preparing the same. Other objects will become apparent from the description and examples.

In accordance with the invention, we prepare the new monomeric compounds by the following sequence of reactions:

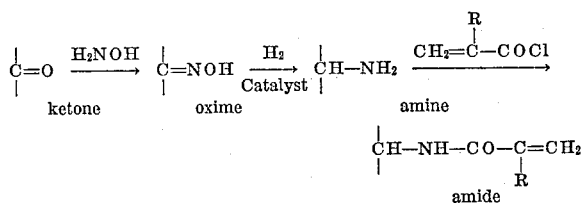

wherein R is defined above. Examples of this preparation are as follows:

Preparation of oxime of 7,7-dimethylbicyclo[3.2.0.]-hept-2-ene-6-one.—Four hundred eight (408) grams (3 moles) of 7,7-dimethylbicyclo[3.2.0.]hept-2-ene-6-one was mixed with 210 g. (3 moles) of hydroxylamine hydrochloride in 300 ml. of water. To this mixture was added a solution of 160 g. (1.5 moles) of sodium carbonate in 450 ml. of water. This mixture was stirred overnight at room temperature. The reaction mixture was extracted with ether, washed with water, dried over anhydrous $MgSO_4$ and then distilled through a 10-in. packed column to obtain 138.5 g. of oxime boiling at 100° C. at 4 mm.

Analysis.—Calcd. for $C_9H_{13}NO$: C, 71.5; H, 8.6; N, 9.3. Found: C, 71.5; H, 9.0; N, 9.2.

Preparation of 7,7 - dimethylbicyclo[3.2.0.]heptan-6-amine.—One hundred grams of the above oxime was hydrogenated in a system comprised of 300 ml. of ethanol, 15 g. of Raney nickel, and 50 ml. of ammonia, at 80° C. and 3000 p.s.i. hydrogen pressure. The catalyst was filtered off and the product distilled through a 10-in. packed column to give 78.0 g. of product amine, boiling point at 92° C./37 mm., $n_D^{20}$—1.4806.

Analysis.—Calcd. for $C_9H_{17}N$: C, 77.7; H, 12.2; N, 10.1. Found: C, 77.5; H, 12.2; N, 10.0.

Preparation of acrylamide from 7,7-dimethylbicyclo [3.2.0.]heptane-6-amine.—Thirteen and nine-tenths grams (0.1 mole) of the above amine was dissolved in 100 ml. of dry benzene containing 20.5 g. (0.2 mole) of triethyl amine and 0.013 g. of hydroquinone monomethyl ether. To this vigorously stirred mixture was added 9.65 g. (0.1 mole+5% excess) of acryl chloride. The addition was carried out below 20° C. by external cooling. After the addition was complete, the mixture was stirred at 25° C. for 2 hr. The triethyl amine hydrochloride was removed by filtering. The benzene solution of the product was stirred with Darco at room temperature, filtered, washed with 10% hydrochloric acid then with water and dried over $Na_2SO_4$. Another 0.13 g. of hydroquinone monomethyl ether was added at this stage and the solvent benzene removed by vacuum stripping. The product was a light amber oil which was induced to form low-melting (30–32° C.) white crystals from evaporating petroleum ether. Infrared spectra contained strong absorption bands at 6.58μ, 6.23μ, and 6.19μ characteristic of amide, olefin and carbonyl groups, respectively.

Analysis.—Calcd. for $C_{12}H_{19}NO$: N, 7.25. Found: N, 7.32.

Preparation of methacrylamide from 7,7-dimethylbicyclo[3.2.0.]heptan-6-amine.—Thirteen and nine-tenths grams (0.1 mole) of the above amine was dissolved in 100 ml. of dry, freshly distilled dioxane containing 0.013 g. of hydroquinone monomethyl ether. A water slurry containing 10.6 g. $Na_2CO_3$ in approximately 35 ml. of distilled water was added to the dioxane solution forming two layers. This heterogeneous mixture was stirred while 10.45 g. (0.1 mole) of methacrylyl chloride was added dropwise at 15–20° C. After the addition was complete the mixture was stirred at room temperature for 1–2 hr. The dioxane layer was separated from the by product NaCl, dried over $Na_2SO_4$, and more hydroquinone monomethyl ether then added. The dioxane was then removed under vacuum at room temperature obtaining an oil. Infrared curves were obtained which supported the proposed methacrylamide structure.

Analysis.—Calcd. for $C_{13}H_{21}NO$: N, 6.76. Found: N, 6.54.

The ketones employed in the above reactions are obtained by the addition of cyclopentadiene to a dialkylketene such as dimethylketene, diethylketene, dibutylketene, ethylbutylketene, etc., by the general method described by Staudinger and Meyer in Helv. Chim. Acta. 7, page 21 (1924).

To prepare the polymers of the invention, the acryamidic monomers (II) above are subjected to polymerizing conditions separately to form the corresponding homopolymers or in admixture with one or more comonomers in the proportions of from 5 to 95 parts by weight of monomer (II) and 95 to 5 parts by weight of comonomer, until from 70 percent to substantially 100 percent of the monomeric material has been converted to the desired polymer. The product can be separated by conventional means from the reaction mixture, for example, by evaporation, precipitation, etc. In general, the copolymers obtained have been found to contain approximately the same proportion of constituents as were present in the starting polymerization mixtures. The temperature can vary widely, but preferably in the range of about 30 to 100° C. Pressures at, above or below atmospheric pressures can be used. Advantageously, the polymerizations may be carried out in the dispersions of the monomeric material in an aqueous medium, although organic solvents such as lower alcohols, e.g., methanol, ethanol, etc., ketones, e.g., acetone, 1,4-dioxane, etc., aliphatic and aromatic hydrocarbons, e.g., heptane, benzene, etc., glycol mono-ethers, e.g., Cellosolve, etc., can also be employed. The term dispersion herein is intended to include both true solutions and emulsions in aqueous or nonaqueous media. Advantageously, the polymerizations are accelerated by the use of heat, actinic light such as ultraviolet and well known polymerization catalysts. Such catalysts are commonly used in the art of polymerization, and our invention is not to be limited to any particular catalyst material. Catalysts which have been found to be especially efficacious comprise the peroxides, e.g., benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc., hydrogen peroxide, persulfates, e.g., alkali metal persulfates such as sodium and potassium persulfates, or ammonium persulfate, etc., perborates, e.g., alkali metal perborates such as sodium and potassium perborates, etc. Other catalysts such as boron trifluoride, 2,2'-azobis (2-methylpropionitrile), ketazines, azines, etc., can also be used. The quantity of catalyst can vary from about 0.1 to 5.0 percent, or even more if desired, based on the weight of monomer to be polymerized. Mixtures in any proportions of these catalysts can be used.

When the polymerizations are carried out in a water medium, an activating agent such as an alkali metal bisulfite, e.g., sodium or potassium bisulfite may advantageously be employed (in about the same amount as the catalyst), as well as a surface active agent such as a fatty alcohol sulfate, e.g., sodium or potassium cetyl sulfate, sodium or potassium lauryl sulfate, etc., aromatic sulfonates, e.g., sodium or potassium salts of alkylnaphthalene sulfonic acids, sulfonated oils, salts of fatty acids, e.g., sodium or potassium stearate, palmitate, etc., ordinary soaps, and the like. Such surface active agents are preferably used in amounts of about 3 to 5 percent based on the weight of the components to be polymerized. Chain regulators such as hexyl, octyl, dodecyl, myristyl mercaptans, etc., can also be advantageously added to the aqueous polymerization reaction mixtures.

Suitable comonomers containing a —CH=C< or $CH_2$=C< group which can be employed to form the copolymers of the invention with the acrylamidic monomers (II) above include vinyl esters of carboxylic acids, e.g., vinyl acetate, vinyl butyrate, vinyl stearate, vinyl trifluoroacetate, vinyl benzoate, corresponding isopropenyl esters, etc., vinyl alkyl ketones, e.g., methyl vinyl ketones, ethyl vinyl ketone, trifluoromethyl vinyl ketone, etc., vinyl alkyl ethers, e.g., methyl vinyl ether, butyl vinyl ether, etc., vinyl sulfonamides, e.g., vinyl sulfonamide, N-methyl vinyl sulfonamide, etc., halogen compounds, e.g., vinyl chloride, vinyl fluoride, vinylidene chloride, vinylidene fluoride, tetrafluoroethylene, chlorotrifluoroethylene, etc., styrenes, e.g., styrene, α-methylstyrene, p-methylstyrene, p-acetaminostyrene, α-acetoxystyrene, etc., acrylic and methacrylic acids, their anhydrides, amides, N-alkyl amides, N,N-dialkyl amides, acrylonitrile, methacrylonitrile and methyl, ethyl, butyl, benzyl and phenyl esters thereof, the esters, amides and ester-amides of fumaric itaconic and citraconic acids, N-vinyl imides, N-vinyl lactams, diolefinic monomers such as isoprene, butadiene, 2,3-dimethylbutadiene, 2-chlorobutadiene, 2-cyanobutadiene, 2-phenylbutadiene, 2-acetoxybutadiene, and the like.

The following examples will serve to illustrate further our new monomers, polymers thereof, and the manner of preparing the same.

Example 1.—The following materials were placed in a pressure bottle and tumbled at 50° C. in a constant temperature water bath for 24 hours:

| | |
|---|---|
| N-(7,7-dimethylbicyclo[3.2.0.]hept-6-yl) acrylamide | g 5 |
| Tert-butyl alcohol | ml 20 |
| 2,2'-azobis(2-methylpropionitrile) | g 0.1 |

The homopolymer separated as a white powder which after washing with isopropyl alcohol and drying, weighed 3.7 g. Films cast from methylene chloride solution thereof had a hot bar sticking point of 170° C. In place of the N-(7,7-dimethylbicyclo[3.2.0.]hept-6-yl) acrylamide, there may be substituted a like amount of N-(7,7-diethylbicyclo[3.2.0.]hept-6-yl) acrylamide, or N-(7,7-dibutylbicyclo[3.2.0.]hept-6-yl)acrylamide, or N-(7,7-methylethylbicyclo[3.2.0.]hept-6-yl) acrylamide, etc., or the corresponding methacrylamides to give homopolymers having generally similar properties and utility.

Example 2.—The following materials were placed in a pressure bottle and tumbled at 50° C. for 18 hours:

| | |
|---|---|
| Acrylonitrile | g 32 |
| N-(7,7-dimethylbicyclo[3.2.0.]hept-6-yl) acrylamide | g 8 |
| Water | ml 200 |
| Lauryl sulfate | g 0.8 |
| Ammonium persulfate | g 0.4 |
| Sodium bisulfite | g 0.2 |
| Tert-dodecyl mercaptan | g 0.2 |

The copolymer product obtained was filtered, washed with water and acetone, and dried. The product weighed 36 g. and a nitrogen analysis showed it contained 81.4 percent acrylonitrile. It was dissolved in dimethylformamide and wet spun into fibers having a tenacity of 2.98 g./d., an elongation of 17 percent, a hot-bar sticking point of 222° C. and a flow point of 210° C. at 0.2 g./d.

Example 3.—Using the method of Example 1, a copolymer was prepared having the composition by weight of 75 parts acrylonitrile and 25 parts N-(7,7-diethylbicyclo[3.2.0.]hept-6-yl) acrylamide. The polymer was compression molded into buttons having the following properties:

| | |
|---|---|
| Modulus | p.s.i. $3.49 \times 10^5$ |
| Elongation | percent 12 |
| Tensile strength | p.s.i. 8900 |
| Heat distortion temperature | ° C. 134 |

Example 4.—Using the method of Example 2, a copolymer was prepared having the composition by weight of 83 parts acrylonitrile and 17 parts N-(7,7-dimethylbicyclo[3.2.0.]hept-6-yl) methacrylamide. It was dissolved in dimethylformamide and dry spun into fibers having a tenacity of 3.6 g./d., an elongation of 19 percent, a sticking point of 218 to 220° C. and a flow point of 202° C. at 0.2 g./d.

Example 5.—A polymer having the composition 65 parts methyl methacrylate and 35 parts N-(7,7-dibutylbicyclo[3.2.0.]hept-6-yl) methacrylamide was prepared as in Example 1. It was molded into clear, hard buttons which had a heat distortion temperature of 162° C.

Example 6.—The following materials were placed in a pressure bottle and tumbled at 60° C. for 20 hours:

| | |
|---|---|
| N-(7-ethyl, 7-butylbicyclo[3.2.0]hept-6-yl)acrylamide | g__ 60 |
| Vinyl chloride | g__ 40 |
| Sulfonated mineral oil | g__ 2.0 |
| Ammonium persulfate | g__ 1.0 |
| Water | ml__ 800 |

The product was obtained as a white powder which after washing and drying, weighed 94 g. The polymer was soluble in cyclohexanone and could be cast into tough, clear films.

Example 7.—The following materials were placed in an autoclave.

| | |
|---|---|
| N-(7,7-diethylbicyclo[3.2.0]hept-6-yl)acrylamide | g__ 25 |
| Butadiene | g__ 75 |
| Soap | g__ 3.0 |
| Potassium persulfate | g__ 1.0 |
| Water | ml__ 400 |

The mixture was stirred at 65° C. for 36 hours. The product was a rubbery material which weighed 91 g.

Example 8.—Using the method of Example 2, a copolymer was prepared having the composition by weight of 81 percent N-(7,7-dimethylbicyclo[3.2.0]hept-6-yl) acrylamide and 19 percent vinyl acetate. The polymer was soluble in methylene chloride and could be cast into clear, strong, flexible films.

Example 9.—Using the method of Example 6, a copolymer was prepared having the composition by weight of 70 percent vinylidene chloride and 30 percent N-(7,7-diethylcyclo[3.2.0]hept-6-yl) methacrylamide. The polymer was soluble in dioxane and could be cast into clear, tough films.

Example 10.—Using the method of Example 1, a copolymer was prepared having the composition by weight of 63 percent N-(7-ethyl, 7-butylbicyclo[3.2.0]hept-6-yl) methacrylamide and 37 percent styrene. It could be molded into hard, clear buttons which had a heat distortion temperature of 132° C. at 66 p.s.i.

Example 11.—Using the method of Example 1, a copolymer was prepared having the composition by weight of 50 percent methyl methacrylate and 50 percent N-(7,7-diethylbicyclo[3.2.0]hept-6-yl) acrylamide. It could be compression molded into clear, tough buttons.

Example 12.—Using the method of Example 2, a copolymer was prepared having the composition by weight of 90 percent N-(7,7-dimethylbicyclo[3.2.0]hept-6-yl) methacrylamide and 10 percent n-butyl acrylate. The polymer was injection molded into bars which had the following properties:

| | |
|---|---|
| Tensile strength | p.s.i__ 9600 |
| Elongation | percent__ 12 |
| Heat distortion | 139° C. at p.s.i__ 66 |

Other generally similar copolymers coming within the scope of the invention may be prepared by following the procedures of the above examples with any of the mentioned copolymerizable comonomers in the specified proportions. These products also show good fiber and film properties and give high quality molded articles. While the examples describing various polymers of the invention have included only the very essential materials, it will be understood that limited amounts of inert materials such as fillers, dyes, pigments, plasticizers, etc., can be incorporated into the various polymer compositions during or after the polymerization step.

The invention has been described in detail with particular reference to preferred embodiments thereof, but it will be understood that variations and modifications can be effected within the spirit and scope of the invention as described hereinabove and as defined in the appended claims.

We claim:
1. A resinous polymer of an acrylic amide having the general structure:

$$\begin{array}{c} \text{O} \\ \parallel \\ CH_2\text{---}CH\text{---}CH\text{---}NH\text{---}C\text{---}C=CH_2 \\ | \quad\quad | \quad\quad\quad\quad\quad\quad\quad\quad | \\ CH_2 \quad CH\text{---}C\text{---}R_1 \quad\quad R \\ \backslash\;/ \quad\quad\quad | \\ CH_2 \quad\quad R_2 \end{array}$$

wherein R represents a member selected from the group consisting of a hydrogen atom and methyl group, and each of $R_1$ and $R_2$ represents an alkyl group of from 1–4 carbon atoms.

2. A resinous copolymer consisting of from 5 to 95 percent by weight N-(7,7-dimethylbicyclo[3.2.0]hept-6-yl) acrylamide and 95 to 5 percent by weight of acrylonitrile.

3. A resinous copolymer consisting of from 5 to 95 percent by weight of N-(7,7-dimethylbicyclo[3.2.0]hept-6-yl) methacrylamide and from 95 to 5 percent by weight of vinylidene chloride.

4. A resinous copolymer consisting of from 5 to 95 percent by weight of N-(7,7diethylbicyclo[3.2.0]hept-6-yl) acrylamide and butadiene.

5. A resinous copolymer consisting of from 5 to 95 percent by weight of N-(7-ethyl, 7-butylbicyclo[3.2.0]hept-6-yl) acrylamide and from 95 to 5 percent by weight of vinyl chloride.

6. A resinous copolymer consisting of from 5 to 95 percent by weight of N-(7,7-dibutylbicyclo[3.2.0]hept-6-yl) methacrylamide and from 95 to 5 percent by weight of methyl methacrylate.

7. A compound of the formula $$\begin{array}{c} \text{O} \\ \parallel \\ CH_2\text{---}CH\text{---}CH\text{---}NH\text{---}C\text{---}C=CH_2 \\ | \quad\quad | \quad\quad\quad\quad\quad\quad\quad\quad | \\ CH_2 \quad CH\text{---}C\text{---}R_1 \quad\quad R \\ \backslash\;/ \quad\quad\quad | \\ CH_2 \quad\quad R_2 \end{array}$$

wherein R represents a member selected from the group consisting of a hydrogen atom and methyl group, and each of $R_1$ and $R_2$ represents an alkyl group of from 1–4 carbon atoms.

8. A compound of the formula $$\begin{array}{c} \text{O} \\ \parallel \\ CH_2\text{---}CH\text{---}CH\text{---}NH\text{---}C\text{---}C=CH_2 \\ | \quad\quad | \quad\quad\quad\quad\quad\quad\quad\quad | \\ CH_2 \quad CH\text{---}C\text{---}R_1 \quad\quad R \\ \backslash\;/ \quad\quad\quad | \\ CH_2 \quad\quad R_2 \end{array}$$

wherein R represents a member selected from the group consisting of a hydrogen atom and methyl group, and each of $R_1$ and $R_2$ represents a methyl group.

9. A compound of the formula $$\begin{array}{c} \text{O} \\ \parallel \\ CH_2\text{---}CH\text{---}CH\text{---}NH\text{---}C\text{---}C=CH_2 \\ | \quad\quad | \quad\quad\quad\quad\quad\quad\quad\quad | \\ CH_2 \quad CH\text{---}C\text{---}R_1 \quad\quad R \\ \backslash\;/ \quad\quad\quad | \\ CH_2 \quad\quad R_2 \end{array}$$

wherein R represents a member selected from the group consisting of a hydrogen atom and methyl group, and each of $R_1$ and $R_2$ represents an ethyl group.

10. A compound of the formula $$\begin{array}{c} \text{O} \\ \parallel \\ CH_2\text{---}CH\text{---}CH\text{---}NH\text{---}C\text{---}C=CH_2 \\ | \quad\quad | \quad\quad\quad\quad\quad\quad\quad\quad | \\ CH_2 \quad CH\text{---}C\text{---}R_1 \quad\quad R \\ \backslash\;/ \quad\quad\quad | \\ CH_2 \quad\quad R_2 \end{array}$$

wherein R represents a member selected from the group consisting of a hydrogen atom and methyl group, and each of $R_1$ and $R_2$ represents a butyl group.

11. A compound of the formula

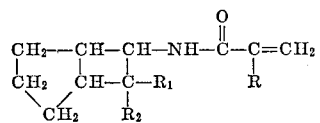

wherein R represents a member selected from the group consisting of a hydrogen atom and methyl group, and wherein $R_1$ is an ethyl group and $R_2$ is a butyl group.

12. A compound of the formula

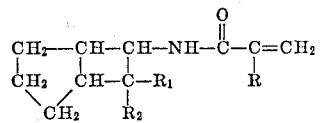

wherein R represents a member selected from the group consisting of a hydrogen atom and methyl group, and wherein $R_1$ is an ethyl group and $R_2$ is a methyl group.

13. A compound of the formula

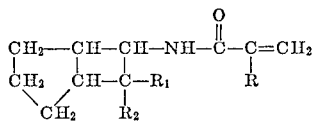

wherein R represents a member selected from the group consisting of a hydrogen atom and methyl group, and wherein $R_1$ is a methyl group and $R_2$ is a butyl group.

References Cited

UNITED STATES PATENTS

| | | | |
|---|---|---|---|
| 3,052,703 | 9/1962 | Morales et al. | 260—561 |
| 3,271,374 | 9/1966 | Caldwell et al. | 260—82.1 |

JOSEPH L. SCHOFER, *Primary Examiner.*

DANIEL K. DENENBERG, *Assistant Examiner.*